United States Patent [19]
Horn et al.

[11] Patent Number: 5,485,528
[45] Date of Patent: Jan. 16, 1996

[54] APPARATUS AND METHOD FOR BACK-PROJECTING AN IMAGE

[75] Inventors: Raymond Horn, Bethesda, Md.; Paul Simoncic, Herndon, Va.

[73] Assignee: Star Technologies, Inc., Va.

[21] Appl. No.: 136,260

[22] Filed: Oct. 15, 1993

[51] Int. Cl.$^6$ .............................. G06K 9/00; G06F 15/00
[52] U.S. Cl. ...................................... 382/131; 364/413.19
[58] Field of Search ................................. 382/6, 131, 132; 364/413.13, 413.14, 413.15, 413.16, 413.17, 413.18, 413.19, 413.2, 413.21

[56] References Cited

U.S. PATENT DOCUMENTS

| | | | |
|---|---|---|---|
| 2,281,931 | 5/1942 | Frank | 250/61.5 |
| 2,748,290 | 5/1956 | Reichertz | 250/83.6 |
| 3,778,614 | 12/1973 | Hounsfield | 364/413.14 |
| 3,924,129 | 12/1975 | LeMay | 364/413.19 |
| 3,927,318 | 12/1975 | Macovski | 378/6 |
| 3,976,885 | 8/1976 | Brunnett et al. | 378/4 |
| 4,044,240 | 8/1977 | Cox, Jr. et al. | 364/413.19 |
| 4,052,619 | 10/1977 | Hounsfield | 378/11 |
| 4,066,903 | 1/1978 | LeMay | 364/413.18 |
| 4,071,769 | 1/1978 | Brunnett et al. | 378/4 |
| 4,114,042 | 9/1978 | LeMay | 364/413.17 |
| 4,135,247 | 1/1979 | Gordon et al. | 382/6 |
| 4,138,721 | 2/1979 | Boyd | 378/14 |
| 4,144,570 | 3/1979 | Wagner | 364/413.18 |
| 4,149,247 | 4/1979 | Pavkovich et al. | 364/413.21 |
| 4,149,248 | 4/1979 | Pavkovich | 364/413.21 |
| 4,168,435 | 9/1979 | Duinker | 364/413.16 |
| 4,293,912 | 10/1981 | Walters | 364/414 |
| 4,583,241 | 4/1986 | Walters | 378/19 |
| 5,128,864 | 7/1992 | Waggener et al. | 364/413.21 |
| 5,414,622 | 5/1995 | Walters | 364/413.19 |

FOREIGN PATENT DOCUMENTS 2521796  11/1976  Germany ..................... G06G 7/12

OTHER PUBLICATIONS

Cahill et al., "The Preliminary Application of a Matrix Inversion Method for Radionuclide Imaging" (1970), *Jnl. of Nucl. Med.*, vol. 11, No. 10, pp. 613–615.

DeRosier et al., "Reconstruction of 3–D Structures from Electron Micrographs", *Nature*, vol. 217, Jan. 1968, pp. 130–134.

Cameron et al., "Measurement of Bone Mineral in Vivo: An Improved Method"; *Science* (1963), vol. 142, Oct. 1963, pp. 230–232.

Correspondence, *British Journal of Radiology*, 46, pp. 314–317 (1973).

Budinger et al., "Three–Dimensional Reconstruction in Nuclear Medicine by Iterative Least–Squares and Fourier Transform Techniques", 31–38, 69–79 (1974).

Peters, "Spatial Filtering to Improve Transverse Tomography", *IEEE Trans. Biomedical Eng.*, vol. BME–21, No. 3, pp. 214–219 (1974).

Cho, "Physical and Mathematical Aspects of Transmission 3–Dimensional Image Reconstruction", pp. 15–26.

Logan, "The Uncertainty Principle in Reconstructing Functions from Projections", *Duke Math. J.*, vol. 42, No. 4, pp. 661–706 (1975).

(List continued on next page.)

*Primary Examiner*—Leo Boudreau
*Assistant Examiner*—Matthew C. Bella
*Attorney, Agent, or Firm*—Finnegan, Henderson, Farabow, Garrett & Dunner

[57] ABSTRACT

A back-projector for use in a CT or other imaging system. For each pixel in the image that is to be reconstructed, a plurality of views of a scanned object are used to generate values for the pixel. The values from the multiple views are combined to yield a pixel value in the reconstructed image. The invention improves the speed and efficiency of existing systems by optimizing memory design and data path size within the back-projector and by implementing a perfect rounding system.

13 Claims, 8 Drawing Sheets

OTHER PUBLICATIONS

Cho et al., "Computer Algorithm for the Tomographic Image Reconstruction with X–Ray Transmission Scans", *Computers and Biomedical Research 8*, 8–25 (1975).

Cho et al., "Computer Algorithms and Detector Electronics for the Transmission X–Ray Tomography", *Science*, No. 1 (NS–21) pp. 218–227 (1974).

Kalos et al., "Conceptual Design of a Vapor Volume Fraction Instrument", NDA 2131–34 (1961).

Smith et al., "Imagery Reconstruction from Finite Numbers of Projections", *J. Phys. A: Math., Nucl. Gen.*, vol. 6 pp. 361–382 (1972).

Bracewell, "Strip Integration in Radio Astronomy", pp. 198–217 (1956).

Gordon, "A Tutorial on ART", *IEEE Trans. Nucl. Sci.*, vol. NS–21, pp. 78–93 (1974).

Oppenheim, "More Accurate Algorithms for Interative 3–Dimensional Reconstruction", *IEEE Trans. Nucl. Sci.*, vol. NS–21, pp. 72–77 (1974).

Cho, "General Views on 3–D Imagery Construction and Computerized Transverse Axial Tomography", *IEEE Trans. Nucl. Sci.*, vol. NS–21, pp. 44–71 (1974).

Shepp et al., "The Fourier Reconstruction of the Head Section" *IEEE Trans. Nucl. Sci.*, vol. NS–21, pp. 23–43 (1974).

Budinger et al., "Three–Dimensional Reconstruction in Nuclear Medicine Emission Imaging", *IEEE Trans. Nucl. Sci.*, vol. NS–21, pp. 2–20 (1974).

Cho, The Nucleus, *IEEE Trans. Nucl. Sci.*, vol. NS–21, pp. 1 (including title page) (1974).

Ramachandran et al., "Three–dimensional Reconstruction from Radiographs and Electron Micrographs: Part III–Descr. and Appln.–Convolution Method", *Indian J. Pure & Applied Phys.*, vol. 9, pp. 997–1003 (1971).

Ramachandran et al., "3–D Reconstruction from Radiographs and Electron Micrographs: Appl. of Convolutions Instead of Fourier Transforms", *Proc. Nat Acad. Sci. USA*, vol. 68, No. 9, pp. 2236–2249 (1971).

Ramachandran, "Reconstruction of Substance from Shadow" (1971), pp. 14–24.

Cormack, "Representation of a Function by its Line Integrals with Some Radiological Applications II", *J. Applied Phys.*, vol. 35 (1964), pp. 2908–2913.

Cormack, "Representation of a Function by its Line Integrals, with some Radiological Applications", *J. Appl. Phys.*, vol. 34, No. 9 (1963), pp. 2722–2726.

Nagai et al., "Computer–Focusing Using an Appropriate Gaussian Function" *J. Nucl. Med.*, vol. 10, No. 5 (1969).

Gordon et al., "Algebraic Reconstruction Techniques (ART) for 3–D Electron Microscopy and X–Ray Photography", *J. theor. Biol.* (1970) 29, 471–481.

Gilbert, "Iterative Method for the 3–D Reconstruction of an Object from Projections", *J. theor. Biol.* (1972) 36, 105–117.

Cho et al., "Computerized Image Reconstruction Methods with Multiple Photon/X–Ray Transmission Scanning", Phys. Med. Biol., 1974, vol. 19, No. 4, pp. 511–522.

Iinuma et al, "Image Restoration in Radioisotope Imaging Systems", Phys. Med. Biol., vol. 12, No. 4 pp. 501–509 (1967).

Bracewell et al., "Inversion of Fan–Beam Scans in Radio Astronomy"(1967).

Gordon et al., "3–D Reconstruction from Projections: A Review of Algorithms".

Lakshminarayanan, "Reconstruction from Divergent Ray Data" State Univ. of N.Y. at Buffalo, Tech. Report #92, Jan. 1975.

1974 Index IEEE Transactions on Biomedical Engineering vol. BME–21, pp. 1–7 (1974).

Introduction to Computed Tomography, General Electric, pp. 1–28.

APPARATUS AND METHOD FOR BACK-PROJECTING AN IMAGE

BACKGROUND OF THE INVENTION

1. Field of the Invention

The present invention relates in general to an apparatus and method for back-projecting an image. More particularly, the present invention relates to an apparatus and associated method for back-projecting an image of an object taken by computed tomography scanners.

2. Background of the Invention

Methods for back-projecting data acquired by computed tomography ("CT") scanners are well-known. A discussion of the background of CT scanners and back-projection methodology is discussed in pending application Ser. No. 06/798,734, filed on Nov. 15, 1985, for a METHOD AND APPARATUS FOR RECONSTRUCTING A COMPUTED TOMOGRAPHIC IMAGE, which is hereby incorporated by reference and constitutes a part of the specification. However, the previous methods and the apparatuses used to back-project convolved data are limited in speed as well as in the accuracy of the results. Previous scanners have used multiple integrated circuits to perform the back-projection of convolved data, which tend to slow down the ability of the scanner to display an image of the object quickly. Moreover, limitations of the methods and apparatuses used have resulted in compromises in both speed And accuracy of the back-projected data.

SUMMARY OF THE PRESENT INVENTION

Accordingly, the present invention is directed to an apparatus and corresponding method that substantially obviate one or more of the problems due to limitations and disadvantages of the related art.

Additional features and advantages of the invention will be set forth in the description which follows, and in part will be apparent from the description or may be learned by the practice of the invention. The objectives and or other advantages of the invention will be realized and attained by the apparatus and corresponding method particularly pointed out in the written descriptions and claims hereof, as well as in the appended drawings.

To achieve these and other advantages in accordance with the purpose of the invention, as embodied and broadly described, the invention includes an apparatus for determining a value of a pixel for a back-projected image of an object, the image generated from a plurality of views of the object, the apparatus having a plurality of detectors and a first memory containing data for each of the plurality of detectors corresponding to a current one of the plurality of views, comprising a means for receiving a pair of coordinates, the pair of coordinates corresponding to the pixel, a means for scaling the received pair of coordinates to a second coordinate system, the scaling means including a table containing a point value and a slope value of a continuous function, means for using the scaled pair of coordinates to interpolate at least one memory address, means for interpolating a back-projected value for the pixel in the current view from values in the first memory corresponding to the interpolated memory address, a means for weighting each back-projected value by a value obtained in accordance with the scaling means, and means for modifying and storing the value of the pixel in a second memory in accordance with the weighted back-projected values.

In another aspect, the invention includes a method for determining a value of a pixel for a back-projected image of an object, the image generated by an apparatus having a plurality of detectors and a first memory containing data for each of the plurality of detectors corresponding to a current one of the plurality of views of the object, comprising the steps of receiving a pair of coordinates, the pair of coordinates corresponding to the pixel, scaling the received pair of coordinates to a second coordinate system, in accordance with a table, in a second memory, containing a point value and a slope value of a continuous function, interpolating at least one memory address in accordance with the scaled pair of coordinates, interpolating a back-projected value for the pixel in the current view from values in the first memory corresponding to the at least one interpolated memory address, weighting each back-projected value in accordance with a scaled value obtained in the scaling step, and modifying the value of the pixel in a third memory in accordance with the weighted back-projected values.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are incorporated in and constitute a part of the specification, illustrate the presently preferred embodiment and method of the invention and, together with the general description given above and the detailed description of the preferred embodiment given below, serve to explain the principles of the invention. Of the drawings.

DETAILED DESCRIPTION OF THE PREFERRED INVENTION

1. Overview

Figure 1:
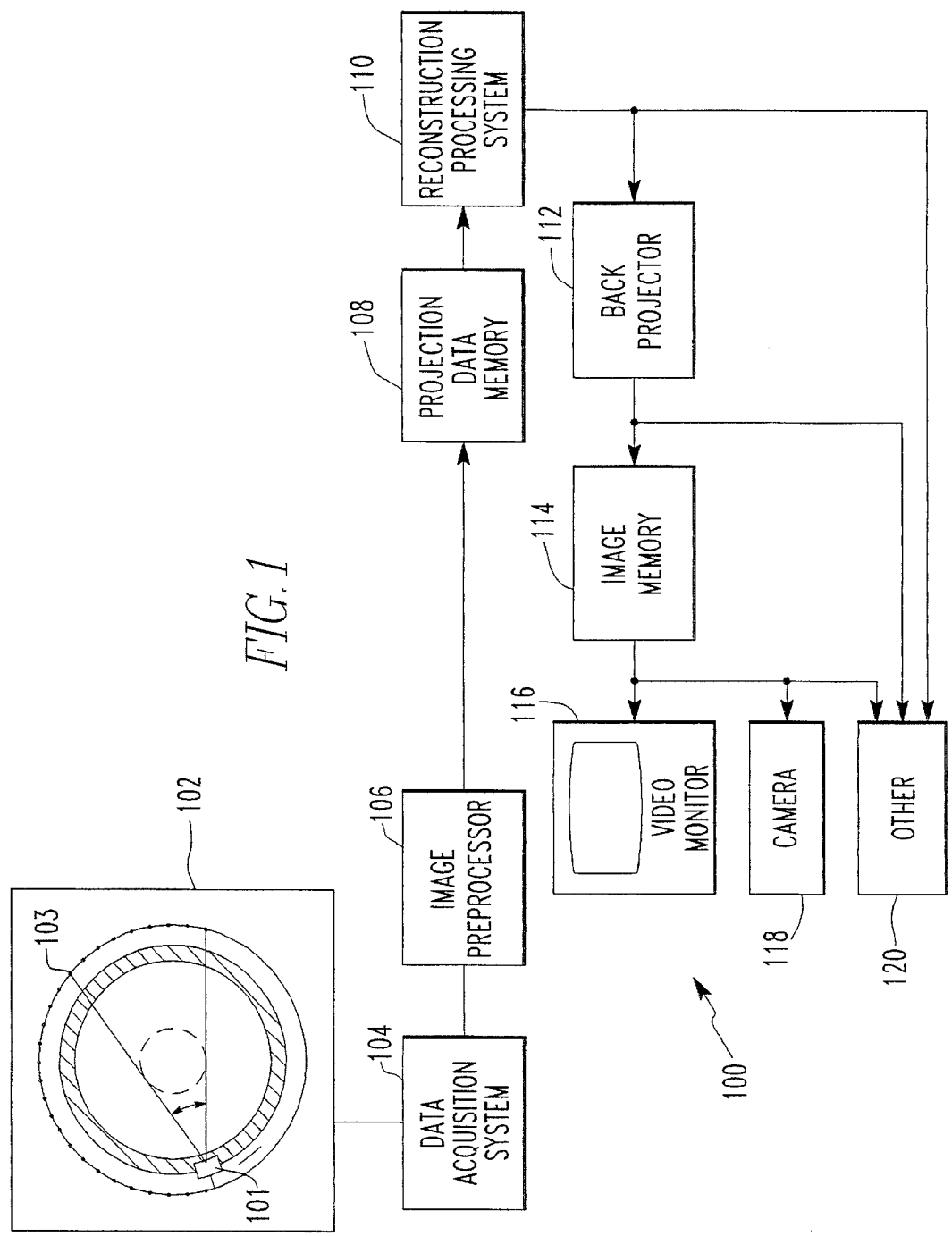
FIG. 1 is a schematic view of a CT scanner according to the present invention.

Reference will now be made in detail to the presently preferred embodiment of the invention as illustrated in the accompanying drawings. The exemplary embodiment of the apparatus is shown in FIG. 1 and is generally designated by reference numeral 100. Apparatus 100 includes a CT gantry 102, which further includes an x-ray source 101 and multiple detectors 103, a central opening for the passage of a patient and suitable table means (not shown), means (not shown) for rotating the x-ray source 101 around the gantry 102 and patient, and a data acquisition system 104 ("DAS") to collect data from the detectors 103, the data including an angle of rotation for the x-ray source 101. The data is then processed in an image preprocessor 106, where the data is sorted and corrected for beam-hardening.

The preprocessed data is then stored in a projection data memory 108 prior to being processed in a reconstruction processing system 110. The reconstruction processing system 110 adjusts the data for angular position, removes redundant data elements and convolves the data with an appropriate convolution function. At this point, the apparatus 100 has generated a plurality of sets of data, each set of convolved raw data corresponding to data from the detectors 103 for a specific view angle. This invention is particularly directed to the back-projector 112, which processes the sets of data to allow the operator to view a completed image on a video monitor 116, through a camera 118 or other suitable device 120.

In the described embodiment, detectors 103 detect x-rays from x-ray source 102. As x-ray source 102 moves around an object, detectors 103 generate a plurality of sets of data, each set of data corresponding to a "view" of the scanned object. The present invention translates the data from these multiple views into an image on monitor 116.

Figure 2:
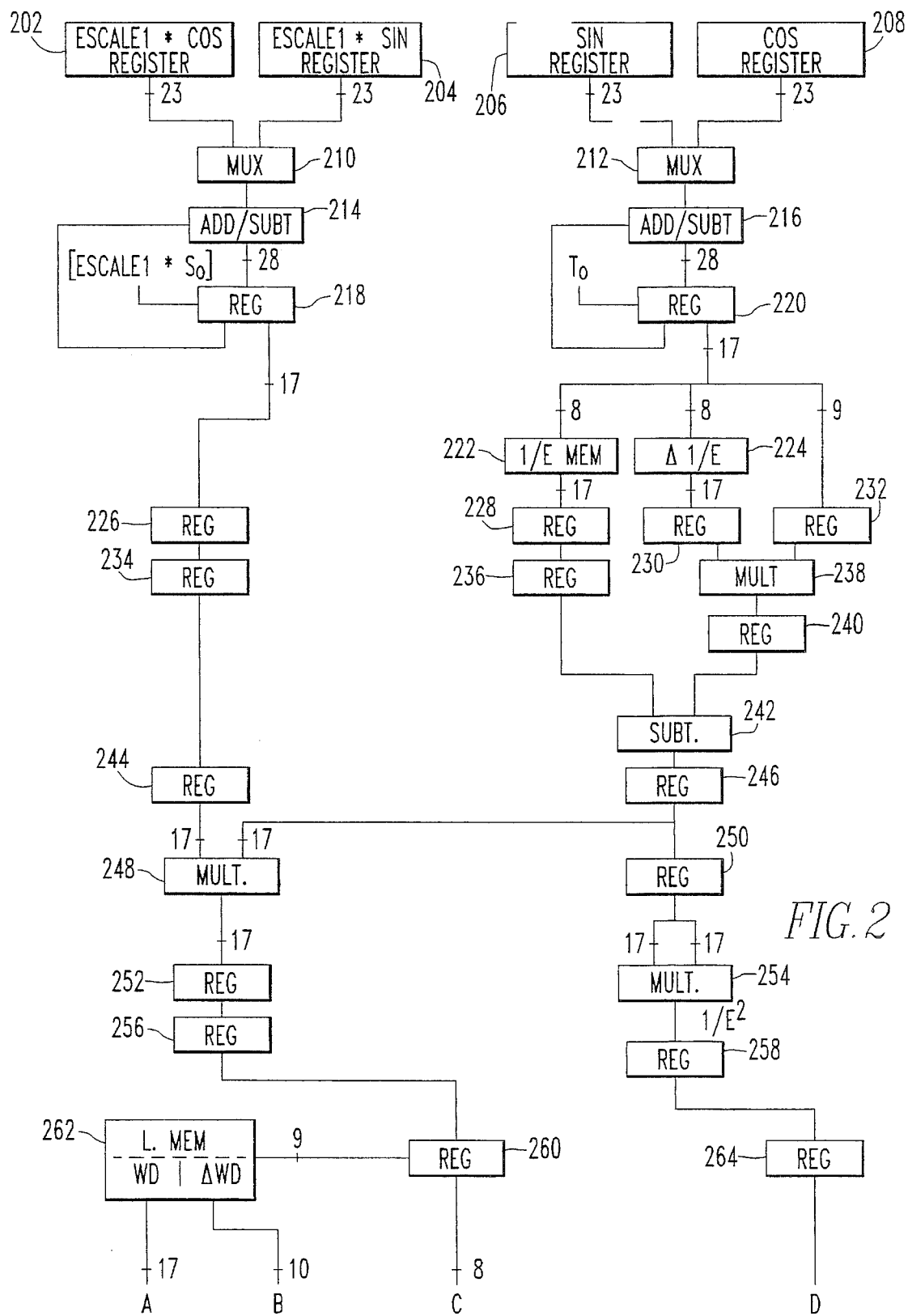
FIG. 2 is a functional diagram of a portion of a preferred back-projector.
Figure 3:
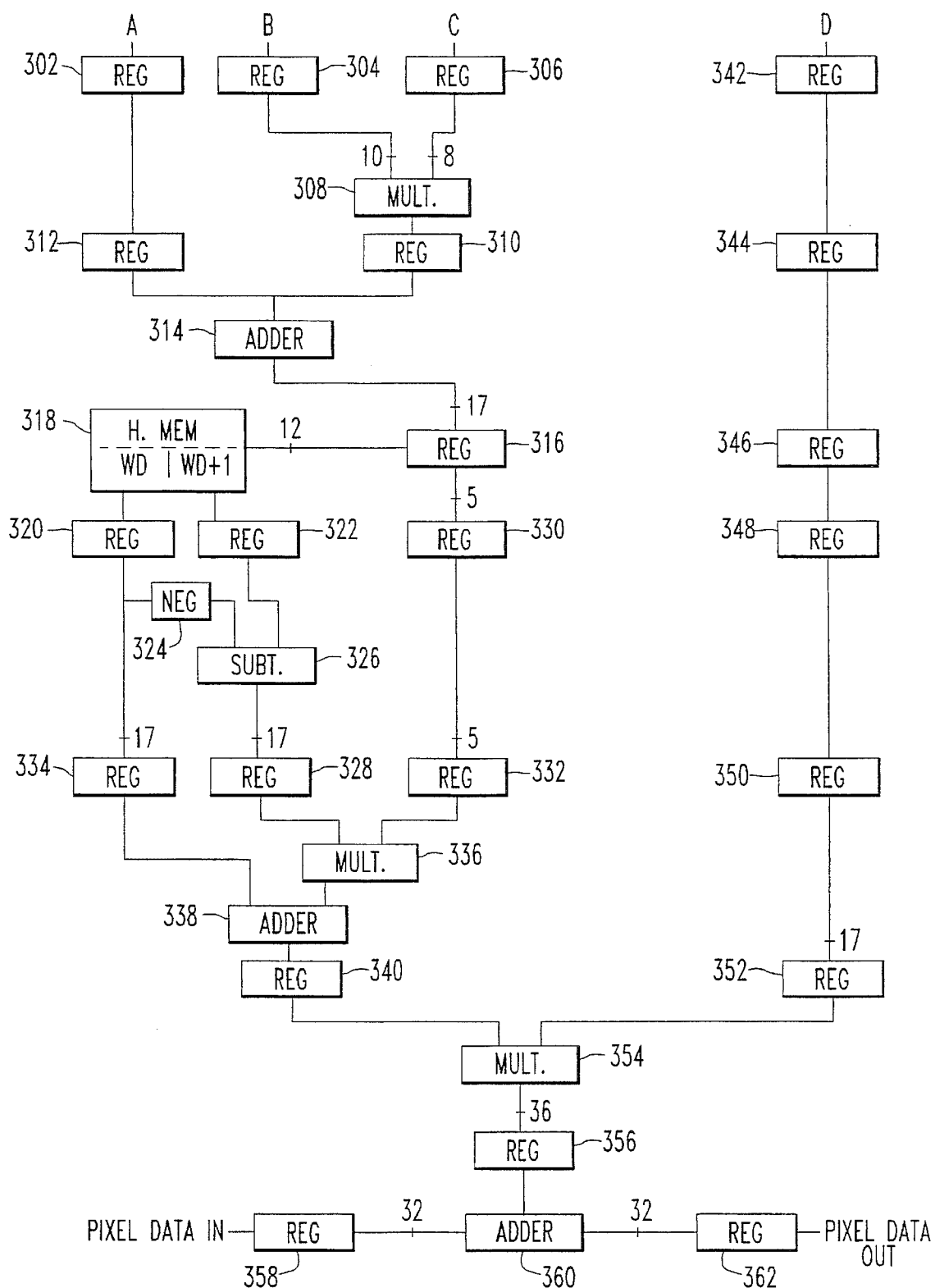
FIG. 3 is a functional diagram of a remaining portion of the preferred back-projector.

Functional diagrams of a preferred embodiment of the back-projector 112 are shown in FIGS. 2 and 3. In the preferred embodiment, all of the structure and memories shown in these two figures, with one exception discussed below, are contained on a single application specific integrated circuit ("ASIC").

2. Background and Theory

Figure 4:
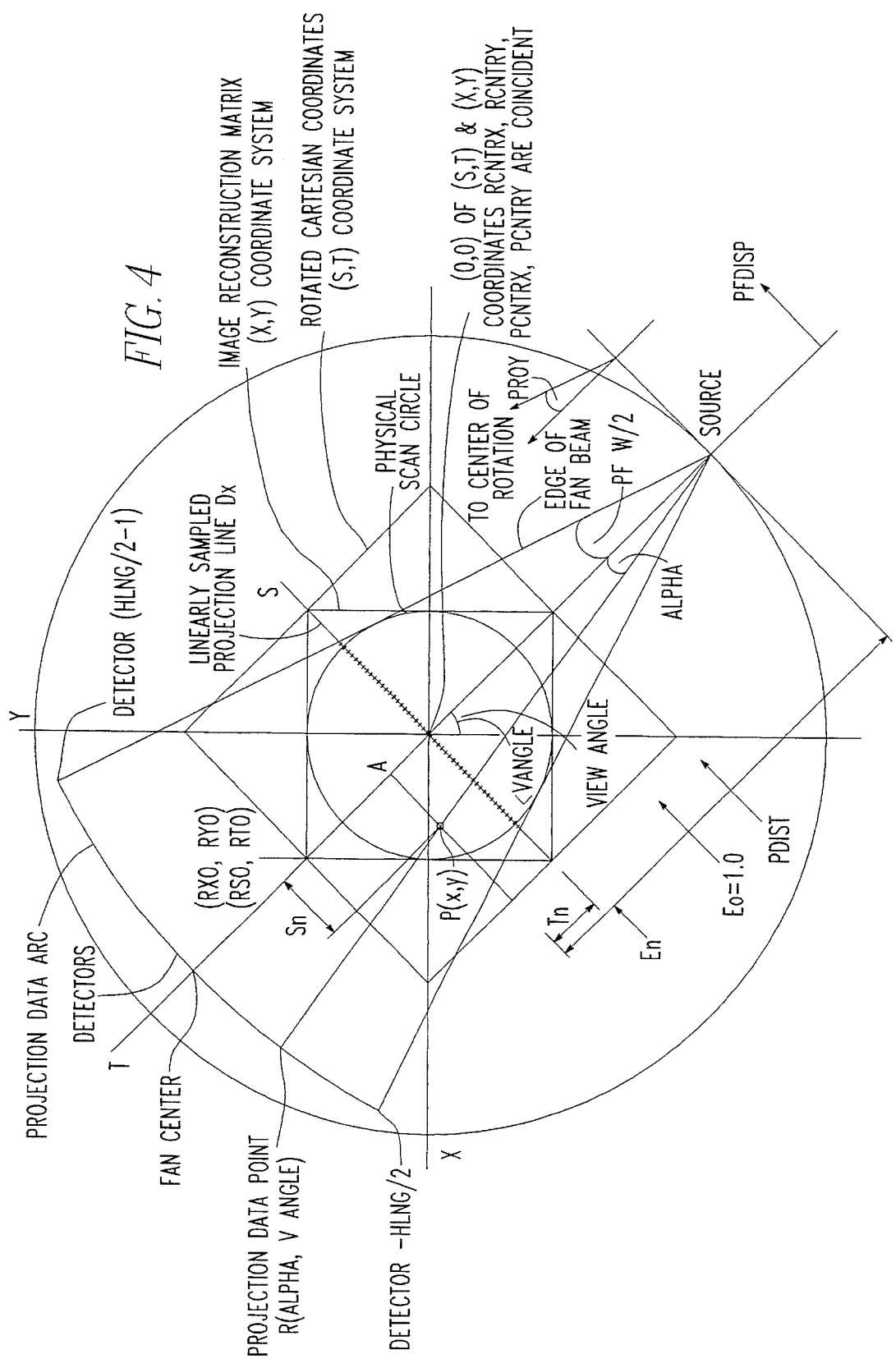
FIG. 4 is a diagrammatic representation of the coordinate systems employed by the back-projector of the present invention.

The back-projector 112 uses three coordinate systems, as shown in FIG. 4. Referring to FIG. 4, the first coordinate system is an Image Reconstruction Matrix using the (x,y) coordinate system. The (x,y) coordinate system is generally aligned with an image matrix or image on the video monitor 116 and the (x,y) coordinates represent (x,y) locations on monitor 116. Although it is not required by the present invention, the physical scan circle, which is created by the x-ray source travelling along the path of rotation and having a fan angle of PFW, preferably fits inside the Image Reconstruction Matrix. In general, the X-axis is parallel to the floor while the Y-axis is perpendicular to the floor on which a CT scanner would sit.

The second coordinate system is a Rotated Cartesian Coordinate System using (S,T) coordinates. The Cartesian Coordinate System rotates in conjunction with the x-ray source around the path of rotation and is centered in the Image Reconstruction Matrix. For each view, the T-axis intersects both the center of the Image Reconstruction Matrix and the apex of the x-ray source's fan beam ("source"). Colinear with the S-axis is a Linearly Sampled Projection Line D. Projection Line D extends, on the S-axis, the width of the fan beam. Projection Line D is comprised of a plurality of equally spaced points, which correspond to addresses in a linear memory, which will be discussed in more detail below.

The third coordinate system used by the back-projector 112 is an S,E coordinate system. The S,E coordinate system uses the S-axis of the rotated Cartesian Coordinate System described above. The value of E for any given pixel, e.g., P(x,y) in FIG. 4, is the distance between the source and point A. As described in detail below, weighted convolved raw data is back-projected into the pixels of the image matrix through simple transformations of the (x,y), the (S,T) and the (S,E) coordinate systems.

It is also to be noted that there is a fourth coordinate system for monitor 116, called a display matrix, which is beyond the scope of this invention. The display matrix, which may or may not correspond to the Image Reconstruction Matrix, is a matrix used to display the image on monitor 116. The display matrix may be rotated, inverted, etc. in relation to the Image Reconstruction Matrix.

Although the back-projector 112 transforms each of the pixels in an image, the following paragraphs discuss transformations for only one pixel, $P(x_n, y_n)$, for ease of explanation. It is understood that the described transformation is performed for each of the pixels in the back-projected image. In this embodiment, the back-projector back-projects a matrix that is 512 pixels by 512 pixels. However, the embodiment is not limited to a 512 matrix size and the back-projector preferably can back-project any rectangular matrix up to 2000 by 2000 pixels. Other embodiments may back-project matrices of other sizes. In addition, the described embodiment back-projects square pixels. Other embodiments may back-project pixels that are not square, e.g., rectangular pixels.

A first step in the transformation is to map the coordinates of the pixel from the (x,y) coordinate system to the (S,T) coordinate system. As shown in FIG. 4, the (S,T) coordinate system for a particular view of an image is determined by the view angle, which is one of the data inputs received by the DAS 104. As can be seen in FIG. 4, once the view angle is known, mapping from the (x,y) coordinate system to the (S,T) coordinate system is relatively simple. Defining the view angle as "vangle", the coordinates $(S_n, Y_n)$ for the pixel $P(x_n, Y_n)$ can be determined as follows:

$$S_n = Y_n * \sin(\text{vangle}) + x_n * \cos(\text{vangle}); \text{ and}$$

$$T_n = Y_n * \cos(\text{vangle}) - x_n * \sin(\text{vangle}).$$

Figure 5:
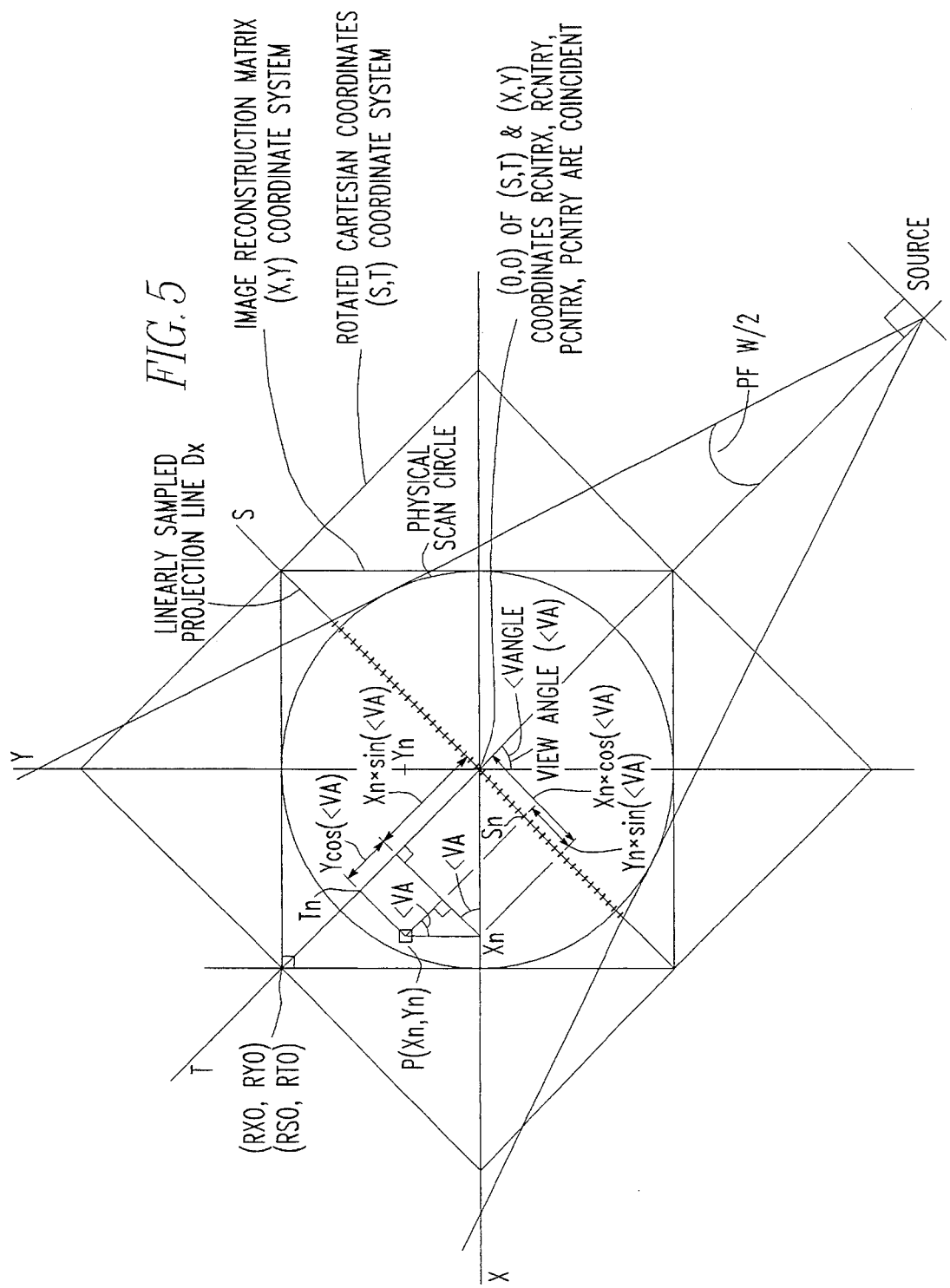
FIG. 5 is a more detailed diagrammatic representation of the coordinate systems employed by the back-projector of the present invention.

Graphic representations of these relationships are shown in FIG. 5.

The next step in the back-projection process is to map this pixel, $(S_n, T_n)$, onto the linearly-sampled Line D at a point where the line between $P(x_n, y_n)$ and the source crosses Line D. Once this D value is known, the back-projector next uses this value to look for an address as described later is interpolated, which will then allow the back-projector to retrieve the appropriate convolved data value for this pixel. This retrieved convolved data value is then multiplied by a weighting factor. The convolved data value must be weighted because all pixels that lie along the line from the source and through $P(x_n, y_n)$ will be projected onto Line D at the same point. Naturally, not all points on that line have the same data value and must therefore be appropriately weighted.

Again referencing FIG. 4, if $P(x_n, y_n)$ is mapped to $(S_n, T_n)$, then based upon equal triangles:

$$D/E_o = S_n/E_n$$

where D is the distance from the T-axis to $P(x_n, y_n)$ (or S when T=0), $E_n$ is the distance from the source to point A, and $E_o$ is the distance from the source to T=0. The distance from the source to the center and edges of the scan circle are known for each CT scanner and does not change. Therefore, setting $E_o$ equal to one and appropriately normalizing the other values of $E_n$ makes solving the equation for D easier. Setting $E_o=1$, D then equals $S_n/E_n$. Based on these known relationships, calculating $E_n$ for each $T_n$ is easily done, as can be seen in FIG. 4 and will be described in detail later. Thus, everything needed to retrieve the raw data to back-project the pixel can be determined once the coordinates $(S_n, T_n)$ are known. In the described embodiment, mapping from the (x,y) coordinate system to the (S,T) coordinate system is done prior to the back-projector 112, but the back-projector also may perform this function in other embodiments.

3. Description of Preferred Embodiments

Using the D value (i.e., the ratio $S_n/E_n$), the back-projector then interpolates a real address using a memory called an "H MEM", which is described in detail below, to retrieve the convolved raw data values for the pixel $P(x_n, y_n)$. FIGS. 2 and 3 show how the value of S and T are used to retrieve and weight the convolved raw data. Generally, the left side of FIG. 2 shows the operations that use the S values, while the right side of FIG. 2 shows the operations that use the T values.

To begin the back-projection process, the S and T coordinates for a first pixel of a certain view are input to registers 218 and 220, respectively. The initial value of T is input directly into register 220, but S must first be multiplied by ESCALE1, ESCALE1 being the cosine of one-half the fan angle, which is equivalent to the ratio $R/S_1$, where R is the radius of the physical scan circle and $S_1$ is one half of the total length of Line D. ESCALE1 is a scaling factor for the S values to ensure that all of the L MEM, which is used to obtain the addresses for the raw data and which is discussed below in detail, is used in the back-projection. This need to scale the S values is best shown in FIGS. 4 and 5 where it can be seen that Projection Line D extends beyond the physical scan circle on both sides of the T-axis to where the edge of the fan beam crosses the S-axis. While the physical scan circle has a radius of R, Line D must extend to where the edge of the fan beam crosses the S-axis in order to accommodate all of the S and T values and to allow full use of the L MEM. If the Line D did not extend to the edge of the fan beam, all of the pixels lying on the outside of the lines between the source and the edge of the physical scan circle when T=0 would not be able to be mapped onto Line D. Additionally, if D extends beyond the edge of the fan beam at S=0, then the L MEM is not fully or efficiently utilized.

Starting from the top of FIG. 2, in order for the back-projector to know the subsequent addresses of pixels to be back-projected, the S and T values must be incremented. This is done for S on the left side of FIG. 2 and for T on the right side. The details of the incrementation calculations will be discussed below, but in general, the S and T values are incremented by adding or subtracting either the cosine or the sine of the view angle. The cosine and sine of the view angle are loaded into registers 202, 204, 206 and 208, with the values for S being multiplied by ESCALE1, for scaling reasons as described above. T values do not need to be multiplied by the ESCALE1 scaling factor and, therefore, registers 206 and 208 contain the sine and cosine values, respectively.

Values from the registers for the S and T values are determined in the multiplexors 210 and 212, respectively, and then appropriately added or subtracted, depending on which pixel is to be determined in adder/subtracters 214 and 216. It should also be noted that FIGS. 2 and 3 show a preferred number of bits for the data paths. However, these number of bits are only the preferred number of bits and the present invention is not limited to this specific embodiment. It should also be noted that the boxes in FIGS. 2 and 3 do not correspond to actual physical entities. For example, the registers may not be independent of the multipliers, subtracters and adders. In fact, the multipliers may be multi-stage multipliers, but are shown as a multiplier and registers.

As explained above, a value for $E_n$, and hence a value for $1/E_n$, is determined for each $T_n$. Rather then storing a plurality of values for $1/E$ and $1/E^2$ in memories, the preferred embodiment interpolates $1/E$ from an integer portion, stored in a 1/E memory device 222, and from a slope portion, in a $\Delta 1/E$ memory device 224. This interpolation occurs as follows. As can be seen in FIG. 2, T is clipped at register 220 to 17 bits, with the first eight bits being used to look up the integer portion of 1/E in the 1/E memory device 222 and the slope portion of 1/E in $\Delta 1/E$ memory device 224. It should be noted that the slope portion ($\Delta 1/E$) is always negative and changes relatively little over the possible values for 1/E. As briefly noted above, the values for 1/E are dependent on the geometry of the individual scanner. Because $E_o = 1$ for T=0, the range of normalized values of $E_n$ depends on the radius of the physical scan circle and the source-to-center distance. For example, if the radius of the physical scan circle is one half of the source-to-center distance, then E varies between 0.5 and 1.5 (i.e., 1±0.5). $E_n$ is determined for each $T_n$ by the following relationship: $E_n = K * T_n + E_o$, where K is a scaling factor to normalize $T_n$ to the same scale as E.

The slope portion of 1/E is then multiplied by the last nine bits of T in multiplier 238 before being subtracted from the integer portion of 1/E at subtracter 242 to yield an interpolated 1/E value. The slope portion of 1/E MEM is determined from a quadratic equation. A preferred method for generating the integer and slope values in the 1/E memory, as well as a preferred quadratic equation, is contained in the Appendix, which is herein incorporated by reference.

The interpolated 1/E value is then multiplied by the S value at multiplier 248, to yield the D value discussed above (D=S/E). The multiplication in multiplier 248 results in a 34 bit number, which is clipped to 17 bits (in the preferred embodiment, the first two bits and the last 15 bits are dropped) before it is sent through registers 252 and 256 to start the process of determining an address of the convolved raw data for the current pixel.

Starting at register 250 on the right side of FIG. 2, the 17 bit 1/E value is then squared at multiplier 254 to yield $1/E^2$, rather than having $1/E^2$ stored in a second memory as shown in some conventional systems. The value $1/E^2$ is the weighting value that will be multiplied by the convolved raw data to yield a contribution to pixel $P(x_n, y_n)$ from this view.

After going through registers 252 and 256, nine bits of the value of S/E from register 260 are used to access memory device L MEM 262 where values for determining addresses for the raw data memory, H MEM, are stored. Rather than storing two values and interpolating a real address (as opposed to an integer address) for the data memory, H MEM, from those two values, an integer and slope are stored in the memory device L MEM 262. In FIG. 2, the integer is shown as WD and the slope is shown as $\Delta$WD. Because a value for a slope is stored, rather than a second value as in the prior art, part of the interpolation has already been completed.

In FIG. 3, the slope, ($\Delta$WD), which is ten bits long, and a fractional part of S/E, which is eight bits long, are multiplied together in a multiplier 308. The result of the multiplication is added to the 17 bit long integer part of the address (WD) in adder 314 to yield a real address of the data in H MEM. The slope portion of L MEM 262 preferably is determined from an inverse tangent function. A preferred method for generating the integer and slope values in the L MEM 262 is discussed in the Appendix, which is herein incorporated by reference.

As with the 1/E memory, the L MEM slope is also scanner specific. In this embodiment, an inverse tangent function is used because the detectors are equiangular (S/E is a function of the tangent of the angles of the detectors). One skilled in the art would be able to determine other appropriate functions for the L MEM slope depending on the architecture of the specific scanner used. For example, one skilled in the art would know that for colinear equispaced detectors, the function would be a linear function (S/E would represent triangles, and therefore the function would be linear). As a second example, one of ordinary skill in the art would know that when the scanner uses a parallel beam, the slope term is a "pass through" term.

Figure 8:
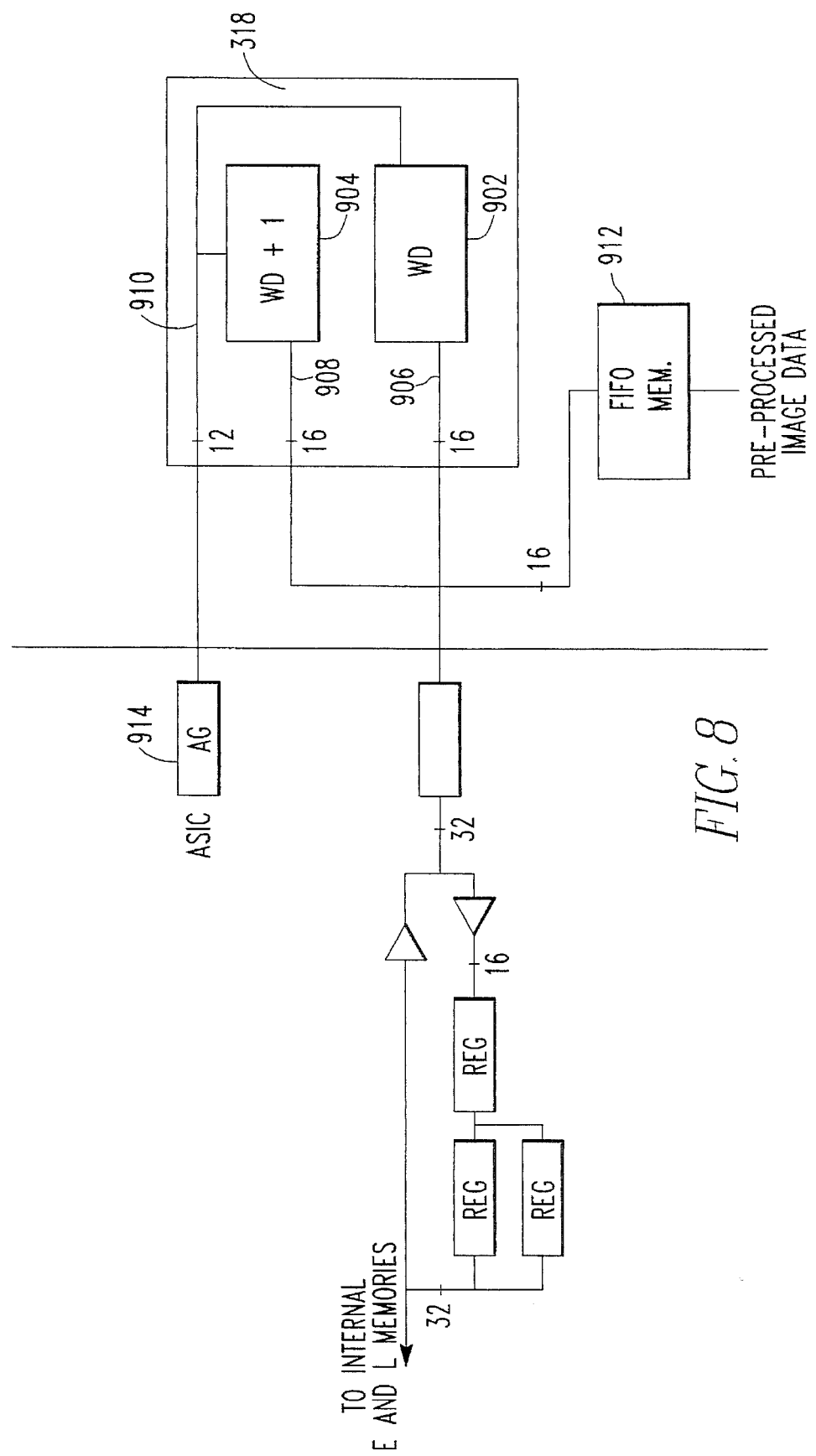
FIG. 8 is a schematic view of a memory device.

The interpolated address from adder 314, which is also a real number that is 17 bits long, is then input to register 316. Twelve bits of the interpolated address access memory device 318, which is also called the "H MEM." Each interpolated address addresses a memory location in the H MEM 318 having two data values—WD and WD+1. A more detailed schematic of the H MEM 318 is shown in FIG. 8, which is discussed below.

Referring again to FIG. 3, subtracter 326 subtracts the two data values output by H MEM 318 to yield a value which is then multiplied by a fractional portion of the interpolated address in multiplier 336. The result is then sent to adder 338 where it is added to the integer portion of WD. The result of this addition is the convolved data value for the current pixel for the current view. The convolved data value then "weighted" by the 1/E$^2$ value in multiplier 354, which is supplied from the B line via delay registers 342, 344, 346, 348, 350 and 352.

This result is then added to previously weighted values for the same pixel, but from other views in adder 360. In FIG. 3, "Pixel Data In" represents previously weighted values for the current pixel.

Figure 7:
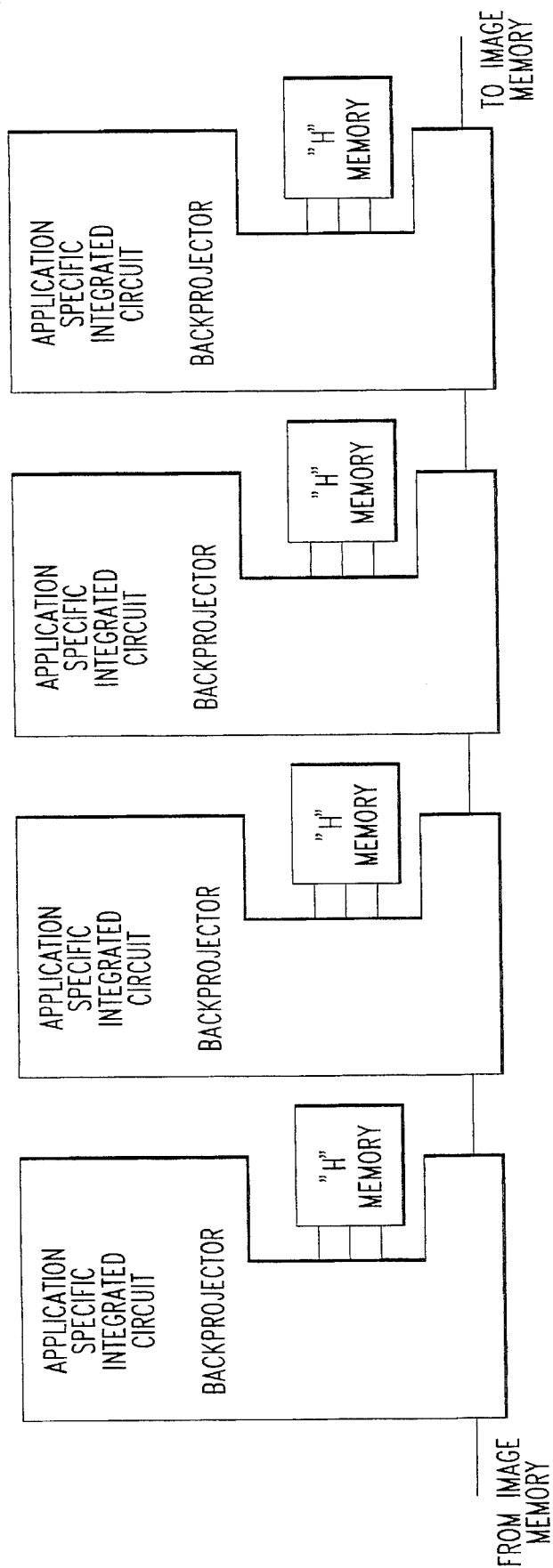
FIG. 7 is a schematic view of four back-projectors daisy-chained together.

The preferred embodiment, as shown in FIG. 7, has four of the ASICs of FIGS. 2 and 3 daisy-chained together. The four ASICs are all synchronized to work in series with one another, each ASIC having the necessary data for a different view in its memories. In one cycle, each ASIC back-projects all of the pixels (512$^2$ pixels for a 512×512 image matrix) for four different views. In the next cycle, new data is loaded into the H MEM 318 for four new views and the 512$^2$ pixels are again processed. This cycle continues until processing for all pixels and all views has been completed. Thus, if there were 1000 views in each image, the embodiment of FIG. 7 would need 250 cycles to back-project the image.

As can be seen in FIG. 8, the H MEM 318 has two distinct memories 902 and 904, WD and WD+1, respectively. Memories 902 and 904 have common address ports but isolated data ports. Lines 906 and 908 are data lines and each line is connected to a memory that allows the data, WD and WD+1, to be independently transmitted to the ASIC. There is only one address line 910 for the two memories 902 and 904 because the WD and WD+1 memories contain the same data, but the data is shifted one memory location in WD+1 memory. Therefore, when an address is simultaneously presented to the WD and WD+1 memories from the address generator 914, the memories 902 and 904 provide adjacent data for the interpolation. This scheme simplifies address generation and allows the adjacent data to be accessed in parallel.

The H MEM is loaded from the FIFO MEM (first in/first out memory) 912 for each view. As can be seen from FIG. 8, 1/E MEM 222, Δ1/E MEM 224, and L memory 262 are loaded through the same FIFO MEM, which generally corresponds to the output of the reconstruction processing system 110. The back-projection setup for a fan beam back-projection with equiangularly spaced detectors is set forth in the appendix and is incorporated in and constitutes a part of the specification. The appendix includes the setup for the E, L and H memories, as well as the definitions and formulas for S, T, and angles of the view.

Although H MEM 318 is shown in FIGS. 7 and 8 to be external to the ASIC, it does not necessarily need to be external and, as one skilled in the art would know, it can also be located inside the ASIC.

Additionally, prior to the providing the result to the adder 360 in FIG. 3, the result of the multiplier 354 can first be "perfect rounded" (also called "round toward even"). In the described embodiment, logic on the ASIC chip located between multiplier 354 and adder 360 performs the below-described function. Other embodiments may perform a different rounding scheme or may not perform rounding at this point.

"Perfect rounding" allows for more accurate rounding of the results of the multiplier 354, which outputs 36 bits to the adder 360, which only adds 32 bits. Therefore, perfect rounding allows for a more accurate rounding of the 32nd bit, or the least significant bit ("LSB") and leads to a more accurate sum of the weighted values for the current pixel. Perfect rounding, as used herein, is similar to the IEEE floating point rounding. Perfect rounding preferably is only used when the last five bits of the value from the multiplier are exactly "X.1000" (in binary), where X is the LSB and can be either "0" or "1" and "0.1000" means that the last four bits are 0.5 in base 10. If the last four bits are less than 0.5, then the number is truncated. If, however, the last four bits are greater than 0.5, then the LSB is incremented. When the last four bits are exactly 0.5, there are two possible situations: the LSB is either even or odd. When the LSB is odd and the last four bits are 0.5, then the LSB is rounded upward. If, however, the LSB is even, then the last four bits are truncated. Perfect rounding is illustrated below for base 10 numbers:

|       | Number | Traditional Rounding | Perfect Rounding |
|-------|--------|----------------------|------------------|
|       | 1.5    | 2.0                  | 2.0              |
|       | 2.5    | 3.0                  | 2.0              |
|       | 3.5    | 4.0                  | 4.0              |
|       | 4.5    | 5.0                  | 4.0              |
| TOTAL | 12.0   | 14.0                 | 12.0             |

One skilled in the art would also recognized that rather than the method shown above, "round toward odd" could be used. Then any odd number could be truncated and any even number with a fraction of 0.5 could be rounded up.

An algorithm for such a perfect rounding scheme would be:

```
Number = X.YZZZ
If (Y = 1) AND [(ALL Z ≠ 0) OR (X = 1)]
    X = X + 1 (CI = 1)
ELSE
(CI = 0)
``` where X is the LSB; Y and Z are the last four bits; and CI is the "carry in" value.

CI is the value that would be added to the LSB in the adder 360. If CI is one, then the LSB is rounded up, but if CI is zero, then the last four bits are simply truncated.

Figure 6:
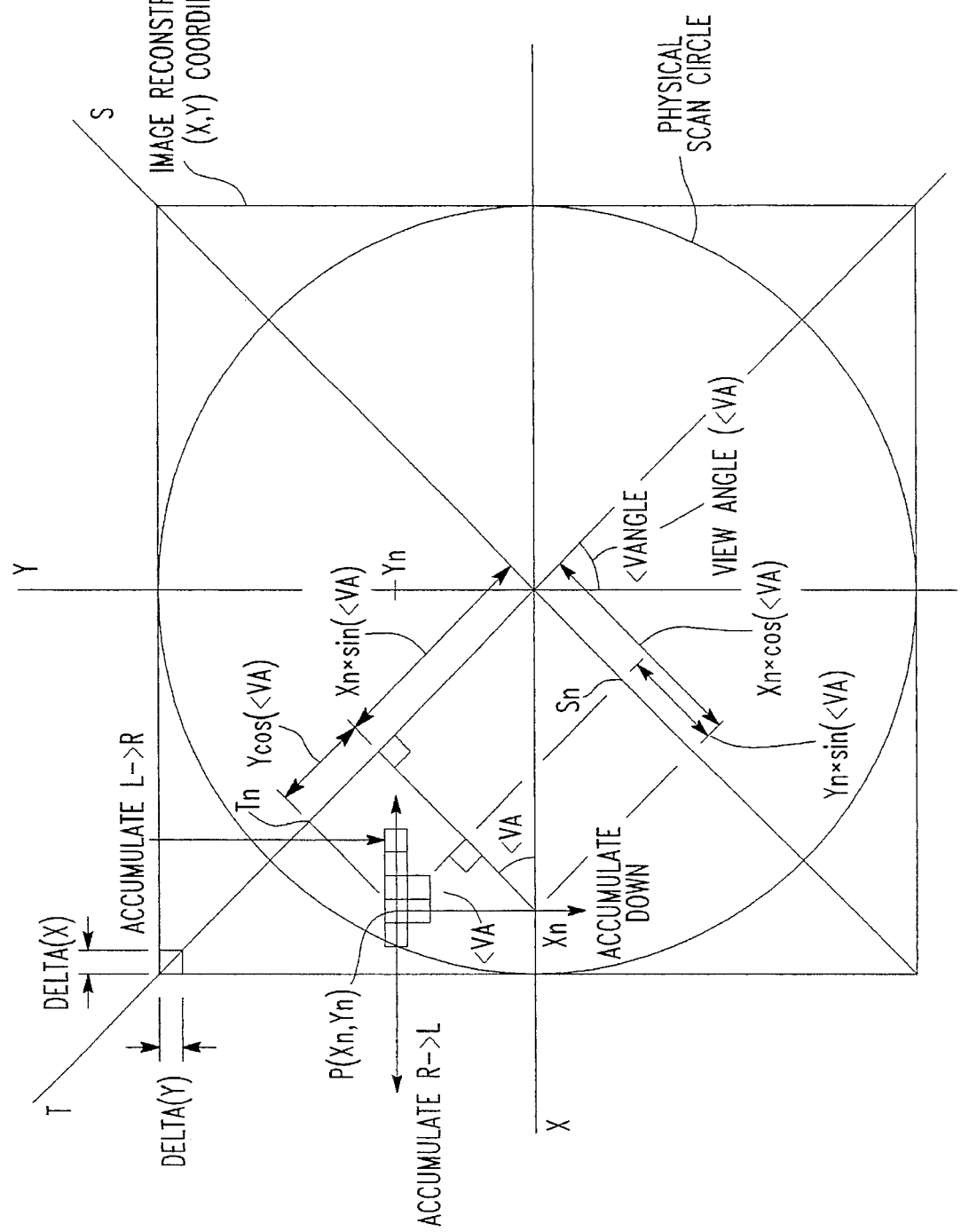
FIG. 6 is a diagrammatic representation of the accumulation of pixels of the preferred back-projector of the present invention.

FIG. 6 illustrates how the system of FIGS. 2 and 3 determines for which pixel a data value is to be back-projected. As described above, the values for S, T, and the sine and cosine of the view angle are loaded into registers for each view. In the preferred embodiment, the system begins with the top left pixel and moves to the right, then drops down a row and goes back to the left in a serpentine motion. While this pattern is preferred, it is to be understood that other embodiments of the back-projector could back-project any pixel adjacent to the previously back-projected pixel, or could back-project only a small portion of the entire image, or could back-project in some other order suitable to the application.

If back-projection starts at the upper left pixel in the image, then processing moves to the right using the following formulas:

$$S_n = S_{n-1} + \Delta(X) * \cos(\text{vangle}); \text{ and}$$

$$T_n = T_{n-1} - \Delta(X) * \sin(\text{vangle})$$

where the $\Delta(x)$ is a pixel width; and vangle is the view angle.

After the system has moved across all 512 pixels in the preferred embodiment, the computer drops to the next row:

$$S_n = S_{n-1} - \Delta(Y) * \sin(\text{vangle}); \text{ and}$$

$$T_n = T_{n-1} - \Delta(Y) * \cos(\text{vangle})$$

where $\Delta(Y)$ is a pixel height.

After dropping into the second row, the system then moves back to the left according to:

$$S_n = S_{n-1} - \Delta(X) * \cos(\text{vangle}); \text{ and}$$

$$T_n = T_{n-1} + \Delta(X) * \sin(\text{vangle}).$$

This pattern continues until all pixels of a certain view are back-projected.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

APPENDIX

This is the BP setup for a fan beam backprojection with equiangularly spaced detectors.

Input Parameters:

```
rdia        =   reconstruction diameter
rxcntr      =   x coordinate of center of reconstruction
rycntr      =   y coordinate of center of reconstruction
matrix      =   maximum number of pixels across or up and down the image
                to be reconstructed
xstart      =   first pixel column to reconstruct (0 is far left)
ystart      =   first pixel row to reconstruct (0 is top)
numviews    =   number of views in image
bp_points   =   number of convolved data points
interp      =   multiple between number of detectors and number of
                convolved data points
theta0      =   initial view angle
dtheta      =   angle between views
src_to_iso  =   distance from the X-Ray source to the center of rotation
src_to_det  =   distance from the X-Ray source to the detector array
detector_spacing = distance between detectors
```

Formula:
```
    cntr_det    =   center detector number (fixed point)

pixsiz =    rdia/(matrix-1);
    center_detector = (int) cntr_det; (truncate)

if ((cntr_det*2.0) < (double)bp_points)
        bp_incr_in_half_fan = cntr_det - 1.0;
    else
        bp_incr_in_half_fan = (double)bp_points - cntr_det;
    bp_point_spacing = ((double)detector_spacing)/interp;

angle_between_bp_points = bp_point_spacing/src_to_det;
    prot = ((cntr_det - (double)center_detector)) * angle_between_bp_points;
    pfw  = angle_between_bp_points * (double)2.0*bp_incr_in_half_fan;

pdia = 2.0*src_to_iso*sin (0.5*pfw);

pepsilon = (double)1.0/(double)32768.0;
    pscale = ((double) matrix + pepsilon)/(double)(matrix-1);
    dscale = 2.0 * (rdia/pdia) / (pscale*(double)(matrix-1));
```

DEFINE:    E MEMORY TABLE VALUES

```
#define   EMEMSIZ 256
#define   LMEMSIZ 512
define   EMULT 65536.0 escale1 = cos(pfw*0.5);

k1 = 1.0;
k2 = pscale*sin(pfw*0.5)/(double)(EMEMSIZ/2);

angle_scale = 0.5;
while ((angle_scale/(k1 - k2*(double)(EMEMSIZ/2))) < 1.0)
   angle_scale = angle_scale*2.0;

last_error = 0.0;

for (i = 0; i < EMEMSIZ; i++)
{
   x1 = (double) (EMEMSIZ/2 - 1 - i);
   x3 = (double) (EMEMSIZ/2 - i);

xp1 = k1 + k2*x1;
   xp3 = k1 + k2*x3;

rtmp1 = 4.0 - 4.0*(2.0*last_error + 1.0/xp1 - 2.0/xp3)*(xp1 -
      2.0*xp3);

xp2 = (-2.0 + sqrt(rtmp1))/(4.0*last_error + 2.0/xp1 - 4.0/xp3);

slope = -1.0/(xp2*xp2);
   intercept = 1.0/xp3 - slope*xp3 - last_error;
   point = slope*xp1 + intercept;

if (i < EMEMSIZ/2)
       j = EMEMSIZ/2 - 1 - i;
   else
       j = 3*EMEMSIZ/2 - 1 - i;

e1_memory[j] = (long) (point*EMULT angle_scale) & 0x1ffff;
   e2_memory[j] = (long) (slope* (xp1-xp3)*EMULT*angle_scale + 0.5) &
      0x7ff;

last_error = 1.0/xp1 - point;

}
```

DEFINE: L MEMORY TABLE VALUES

```
   xp2 = 2.0*tan(0.5*pfw)*pscale/(double)(NEW_LMEMSIZ);

rtmp1 = ((double)(-(NEW_LMEMSIZ/2)) + SE_TRUNC_SHIFT) * xp2;
   lvalue = (atan(rtmp1)+prot) / angle_between_bp_points;

for (i = 0; i < NEW_LMEMSIZ; i++)
   {
      point = lvalue;
      rtmp1 = ((double)(i - (NEW_LMEMSIZ/2) + 1) + SE_TRUNC_SHIFT) * xp2;
      lvalue = (atan(rtmp1) + prot) / angle_between_bp_points;

slope = lvalue - point;

if (i < (NEW_LMEMSIZ/2))
         j = (NEW_LMEMSIZ/2)+i;
      else
         j = i - (NEW_LMEMSIZ/2);

if (point >= 0.0)
         l1_memory[j] = ((long)(point*32.0/angle_scale + 1.0)) & 0x1ffff;
      else
         l1_memory[j] = ((long)(point*32.0/angle_scale)) & 0x1ffff;
      l2_memory[j] = (long)(slope*32.0/angle_scale + 0.5) & 0x3ff;
   }
```

Define: S, T, scos, ssin, tcos, tsin for each view

```
   #define   SE_TRUNC_SHIFT 1.0/512.0
   #define   SBIAS              512
   #define   TBIAS             1024
   #define   STMASK    0x0fffffff
   #define   STSIGN    0x08000000
   #define   ST_SE     0xf8000000
   #define   DMASK     0x007fffff
   #define   DSIGN     0x00400000
   #define   D_SE      0xffc00000
   #define   BINARY_SHIFT 134217728.0 vangle = dtheta*(double)viewnum + theta0;

dalpha = vangle*PI/180.0;
   sin_dalpha = sin(dalpha);
   cos_dalpha = cos(dalpha);

dx0 = 2.0*rxcntr/(pdia*pscale);
   dy0 = 2.0*rycntr/(pdia*pscale);

dhs0 = (dx0*cos_dalpha + dy0*sin_dalpha)*escale1;
   dht0 = -dx0*sin_dalpha + dy0*cos_dalpha;
```

```
tdhcos = dscale*cos_dalpha;
tdhsin = dscale*sin_dalpha;
sdhcos = tdhcos*escale1;
sdhsin = tdhsin*escale1;

/* multiply by 2**27 to align binary points */
if (tdhcos >= 0.0)
{
   tcos = (long)(tdhcos*BINARY_SHIFT + 0.5);
   scos = (long)(sdhcos*BINARY_SHIFT + 0.5);
}
else
{
   tcos = (long)(tdhcos*BINARY_SHIFT - 0.5);
   scos = (long)(sdhcos*BINARY_SHIFT - 0.5);
} if (tdhsin >= 0.0)
{
   tsin = (long)(tdhsin*BINARY_SHIFT + 0.5);
   ssin = (long)(sdhsin*BINARY_SHIFT + 0.5);
}
else
{
   tsin = (long)(tdhsin*BINARY_SHIFT - 0.5);
   ssin = (long)(sdhsin*BINARY_SHIFT - 0.5);
} if (dhs0 >= 0.0)
    scoord = (long) (dhs0*BINARY_SHIFT + 0.5);
else
    scoord = (long) (dhs0*BINARY_SHIFT - 0.5);
if (dht0 >= 0.0)
    tcoord = (long) (dht0*BINARY_SHIFT + 0.5);
else
    tcoord = (long) (dht0*BINARY_SHIFT - 0.5);

/* Match scoord and tcoord to the starting pixel */
if (ystart & 0x1)
{
    scoord += ( (long)(matrix - 1 - 2*ystart)*ssin +
                (matrix - 1 - 2*xstart)*scos + 1 )/2 + SBIAS;
    tcoord += ( (long)(matrix - 1 - 2*ystart)*tcos -
                (matrix - 1 - 2*xstart)*tsin + 1 )/2 + TBIAS;
}
else
{
    scoord += ( (long)(matrix - 1 - 2*ystart)*ssin -
                (matrix - 1 - 2*xstart)*scos + 1 )/2 + SBIAS;
    tcoord += ( (long)(matrix - 1 - 2*ystart)*tcos +
                (matrix - 1 - 2*xstart)*tsin + 1 )/2 + TBIAS;
}
```

We claim:

1. An apparatus for determining a value of a pixel for a back-projected image generated from a plurality of views of an object comprising:

a plurality of detectors;

a first memory, coupled to the detectors, for holding data for a current one of said plurality of views;

means, coupled to the first memory, for receiving a pair of coordinates, said pair of coordinates corresponding to the pixel;

means, coupled to the receiving means, for scaling the received pair of coordinates to a second coordinate system, the scaling means including a table containing a point value and a slope value of a continuous function;

first means, coupled to the scaling means, for interpolating at least one memory address from the scaled pair of coordinates;

second means, coupled to the first interpolating means, for interpolating a back-projected value for said pixel in the current view from values in said first memory corresponding to said at least one interpolated memory address;

means, coupled to the second interpolating means, for weighting each back-projected value by a value obtained in accordance with the scaling means;

a second memory; and means coupled to the weighing means and the second interpolating means, for modifying and storing the value of said pixel in a second memory in accordance with the weighted back-projected values.

2. An apparatus for determining a value of a pixel for a back-projected image generated from a plurality of views of an object comprising:

a plurality of detectors;

a first memory, coupled to the detectors, for holding data for a current one of said plurality of views;

means, coupled to the first memory, for receiving a pair of coordinates, said pair of coordinates corresponding to the pixel;

means, coupled to the receiving means, for scaling the received pair of coordinates to a second coordinate system;

first means, coupled to the scaling means, for interpolating at least one memory address having a real part and a fractional part from the scaled pair of coordinates, the scaling means including a table containing a point value and a slope value of a continuous function;

second means, coupled to the first interpolating means, for interpolating a back-projected value for said pixel in the current view from values in said first memory corresponding to said at least one interpolated memory address;

means, coupled to the second interpolating means, for weighting each back-projected value by a value obtained in accordance with the scaling means;

a second memory; and means, coupled to the weighting means and the second interpolating means, for modifying and storing the value of said pixel in a second memory in accordance with the weighted back-projected values.

3. An apparatus for determining a value of a pixel for a back-projected image generated from a plurality of views of an object, said apparatus comprising:

an x-ray source with a fan angle;

a plurality of detectors;

a first memory, coupled to the detectors, for holding data for a current one of said plurality of views;

means, coupled to the first memory, for receiving a pair of S,T coordinates, said pair of S,T coordinates corresponding to the pixel;

means, coupled to the receiving means, for multiplying the S coordinate value by $\cos \phi/2$, where $\phi$ is a fan angle of said x-ray source;

means, coupled to the multiplying means, for scaling the S,T coordinate pair to an S,E coordinate system;

first means, coupled to the scaling means, for interpolating at least one memory address from the scaled pair of coordinates;

second means coupled to the first interpolating means, for interpolating a back-projected value for said pixel in the current view from values in said first memory corresponding to said at least one interpolated memory address;

means, coupled to the second interpolating means, for weighting each back-projected value by a value obtained in accordance with the scaling means;

a second memory; and means, coupled to the weighting means and the second interpolating means, for modifying and storing the value of said pixel in a second memory in accordance with the weighted back-projected values.

4. An apparatus for determining a value of a pixel for a back-projected image generated from a plurality of views of an object comprising:

a plurality of detectors;

a first memory, coupled to the detectors, for holding data for a current one of said plurality of views;

means coupled to the first memory for receiving a pair of coordinates, said pair of coordinates corresponding to the pixel;

means, coupled to the receiving means, for scaling the received pair of coordinates to a second coordinate system;

first means, coupled to the scaling means, for interpolating at least one memory address from the scaled pair of coordinates;

second means, coupled to the first interpolating means, for interpolating a back-projected value for said pixel in the current view from values in said first memory corresponding to said at least one interpolated memory address;

means, coupled to the second interpolating means, for weighting each back-projected value by a value obtained in accordance with the scaling means;

means, coupled to the weighting means, for rounding the weighted back-projected value by a "round toward even" scheme;

a second memory; and means, coupled to the weighting means and the second interpolating means, for modifying and storing the value of said pixel in the second memory in accordance with the weighted back-projected values.

5. The apparatus of claim 1, wherein the received pair of coordinates include an S value and a T value, and wherein the scaling means include:

means for addressing the point value and the slope value in the table in the scaling means, using the T value, to yield a point value and a slope value; and means for multiplying the slope value by a portion of the T value; and means for combining the point value and the output of the multiplying means to yield a scaled value.

6. The apparatus of claim 1, further including means for squaring the output of the scaling means, wherein the squared value is input to the weighting means.

7. An apparatus for determining a value of a pixel for a back-projected image of an object, said image generated from a plurality of views of the object, said apparatus having a plurality of detectors, comprising:

a first integrated circuit including a memory for holding data for each of said plurality of detectors corresponding to one of said plurality of views; and a second integrated circuit including:

means for receiving a pair of coordinates, said pair of coordinates corresponding to a location of the pixel in said image, means for scaling the received pair of coordinates to a second coordinate system, the scaling means including a table containing a point value and a slope value of a continuous function, means, connected to the memory, for interpolating at least one memory address from the scaled pair of coordinates and for interpolating a back-projected value for said pixel from values from the memory corresponding to said interpolated address, means for weighting the back-projected value by a value obtained in accordance with the scaling means, and means for modifying and storing the value of said pixel in a second memory in accordance with the weighted back-projected value.

8. A method for determining a value of a pixel for a back-projected image of an object executed by a back-projecting apparatus, said image generated by an apparatus having a plurality of detectors and a first memory containing data for each of said plurality of detectors corresponding to a current one of said plurality of views of the object, comprising the steps of:

receiving a pair of coordinates, said pair of coordinates corresponding to the pixel;

scaling the received pair of coordinates to a second coordinate system, in accordance with a table, in a second memory, containing a point value and a slope value of a continuous function;

interpolating at least one memory address in accordance with the scaled pair of coordinates;

interpolating a back-projected value for said pixel in the current view from values in said first memory corresponding to said at least one interpolated memory address;

weighting each back-projected value in accordance with a scaled value obtained in the scaling step; and modifying the value of said pixel in a third memory in accordance with the weighted back-projected values.

9. A method for determining a value of a pixel for a back-projected image of an object executed by a back-projecting apparatus, said image generated by an apparatus having a plurality of detectors and a first memory containing data for each of said plurality of detectors corresponding to a current one of said plurality of views of the object, comprising the steps of:

receiving a pair of coordinates, said pair of coordinates corresponding to the pixel;

scaling the received pair of coordinates to a second coordinate system;

interpolating a memory address having a real part and a fractional part in accordance with the scaled pair of coordinates and a table, in a second memory, containing a point value and a slope value of a continuous function;

interpolating a back-projected value for said pixel in the current view from values in said first memory corresponding to said at least one interpolated memory address;

weighting each back-projected value in accordance with a scaled value obtained in the scaling step; and modifying the value of said pixel in a third memory in accordance with the weighted back-projected values.

10. A method for determining a value of a pixel for a back-projected image of an object executed by a back-projecting apparatus, said image generated by an apparatus having an x-ray source, a plurality of detectors of x-rays from the x-ray source, and a first memory containing data for each of said plurality of detectors corresponding to a current one of said plurality of views of the object, comprising the steps of:

receiving a pair of S,T coordinates, said pair of S,T coordinates corresponding to the pixel;

multiplying the S coordinate value by $\cos \phi/2$, where $\phi$ is a fan angle of said x-ray source;

scaling the S,T coordinate pair to an S,E coordinate system according to a point value and a slope value of a continuous function;

interpolating at least one memory address in accordance with the scaled pair of coordinates;

interpolating a back-projected value for said pixel in the current view from values in said first memory corresponding to said at least one interpolated memory address;

weighting each back-projected value in accordance with a scaled value obtained in the scaling step; and modifying the value of said pixel in a second memory in accordance with the weighted back-projected values.

11. A method for determining a value of a pixel for a back-projected image of an object executed by a back-projecting apparatus, said image generated by an apparatus having a plurality of detectors and a first memory containing data for each of said plurality of detectors corresponding to a current one of said plurality of views of the object, comprising the steps of:

receiving a pair of coordinates, said pair of coordinates corresponding to the pixel;

scaling the received pair of coordinates to a second coordinate system according to a point value and a slope value of a continuous function;

interpolating at least one memory address in accordance with the scaled pair of coordinates;

interpolating a back-projected value for said pixel in the current view from values in said first memory corresponding to said at least one interpolated memory address;

weighting each back-projected value in accordance with a scaled value obtained in the scaling step;

rounding the weighted back-projected value by a "round toward even" scheme; and modifying the value of said pixel in a second memory in accordance with the rounded weighted back-projected values.

12. The method of claim 8, wherein the received pair of coordinates include an S value and a T value, and wherein the scaling step includes the steps of:

addressing the point value and the slope value in the table in the second memory, using the T value, to yield a point value and a slope value;

multiplying the slope value by a portion of the T value; and combining the point value and the output of the multiplying step to yield a scaled value.

13. The method of claim 8, further including a step of squaring the output of the scaling step, wherein the squared value is used in the weighting step.

* * * * *

UNITED STATES PATENT AND TRADEMARK OFFICE
CERTIFICATE OF CORRECTION

PATENT NO. : 5,485,528

DATED : January 16, 1996

INVENTOR(S) : Horn et al.

It is certified that error appears in the above-identified patent and that said Letters Patent is hereby corrected as shown below:

Claim 3, col. 20, line 12, after "system", insert --according to a point value and a slope value of a continuous function--.

Claim 4, col. 20, line 41, after "system", insert --according to a point value and a slope value of a continuous function--.

Signed and Sealed this

Twelfth Day of March, 1996

Attest:

BRUCE LEHMAN

Attesting Officer

Commissioner of Patents and Trademarks